US012069052B2

(12) United States Patent
Basu et al.

(10) Patent No.: US 12,069,052 B2
(45) Date of Patent: Aug. 20, 2024

(54) CLIENT DEVICE CAPABLE OF DYNAMICALLY ROUTING AUTHENTICATION REQUESTS TO A BACKUP AUTHENTICATION SYSTEM

(71) Applicant: Microsoft Technology Licensing, LLC, Redmond, WA (US)

(72) Inventors: Anirban Basu, Sammamish, WA (US); Oren Jordan Melzer, Redmond, WA (US); Kamen K. Moutafov, Sammamish, WA (US); Victor Boctor, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 422 days.

(21) Appl. No.: 17/334,650

(22) Filed: May 28, 2021

(65) Prior Publication Data
US 2022/0385660 A1    Dec. 1, 2022

(51) Int. Cl.
*H04L 29/06*    (2006.01)
*H04L 9/32*    (2006.01)
*H04L 9/40*    (2022.01)

(52) U.S. Cl.
CPC ........ *H04L 63/0884* (2013.01); *H04L 9/3247* (2013.01); *H04L 63/0281* (2013.01);
(Continued)

(58) Field of Classification Search
CPC .............. H04L 63/0884; H04L 9/3247; H04L 63/0281; H04L 63/0815; H04L 63/0876;
(Continued)

(56) References Cited

U.S. PATENT DOCUMENTS 8,155,275 B1 * 4/2012 Barnes .................... H04M 3/51
                                                                                379/67.1
9,356,968 B1 * 5/2016 Dotan ..................... G06F 21/31
(Continued)

FOREIGN PATENT DOCUMENTS

CN        105430016 A  *  3/2016   .............. H04L 1/22
CN        108259457 A  *  7/2018   ......... H04L 63/0876
(Continued)

OTHER PUBLICATIONS

"Liang, Research on Cross-domain Secure Communication Technology of Sensitive Information under Microservice Framework, Dec. 1, 2019, IEEE Conference Paper, pp. 58-63." (Year: 2019).*
(Continued)

*Primary Examiner* — Sher A Khan
(74) *Attorney, Agent, or Firm* — Wade IP Law PLLC

(57) ABSTRACT

Techniques are described herein that are capable of dynamically routing an authentication request to a backup authentication system by a client device. For instance, the client device stores a list, which identifies authentication systems that are authorized to respond to authentication requests from the client device. The client device sends the authentication request toward a primary authentication system based at least in part on the authentication request identifying the primary authentication system as a recipient of the authentication request. The authentication request requests authentication of a principal by the primary authentication system. The client device causes the backup authentication system to authenticate the principal using an authentication package received from the primary authentication system by dynamically routing the authentication request to the backup authentication system based at least in part on not receiving a valid response to the authentication request and further based at least in part on the list.

20 Claims, 5 Drawing Sheets

(52) U.S. Cl.
CPC ...... *H04L 63/0815* (2013.01); *H04L 63/0876* (2013.01); *H04L 63/101* (2013.01)

(58) Field of Classification Search
CPC . H04L 63/101; H04L 63/0807; H04L 63/126; H04L 9/3213
See application file for complete search history.

(56) References Cited

U.S. PATENT DOCUMENTS

| | | | |
|---|---|---|---|
| 9,967,395 B1 | 5/2018 | Karimli et al. | |
| 9,979,727 B2* | 5/2018 | Sakura | H04L 63/08 |
| 10,356,128 B1 | 7/2019 | Lango et al. | |
| 10,360,366 B1* | 7/2019 | Dubey | H04L 41/0663 |
| 10,362,007 B2 | 7/2019 | Hill | |
| 10,509,914 B1 | 12/2019 | Desai et al. | |
| 10,652,281 B1 | 5/2020 | Moolenaar et al. | |
| 10,832,244 B1 | 11/2020 | Chowdhury | |
| 10,972,465 B1 | 4/2021 | Bendersky et al. | |
| 11,140,061 B1 | 10/2021 | Sanders et al. | |
| 11,206,179 B1* | 12/2021 | Rathore | H04L 63/0807 |
| 11,240,275 B1 | 2/2022 | Vashisht et al. | |
| 11,256,573 B1 | 2/2022 | Ambaljeri et al. | |
| 11,363,012 B1 | 6/2022 | Chhabra et al. | |
| 11,574,035 B2 | 2/2023 | Singh et al. | |
| 11,626,996 B2 | 4/2023 | Campagna et al. | |
| 11,626,998 B2 | 4/2023 | Mozano et al. | |
| 2003/0208681 A1 | 11/2003 | Muntz et al. | |
| 2005/0055552 A1* | 3/2005 | Shigeeda | H04L 63/0823 713/171 |
| 2007/0022469 A1* | 1/2007 | Cooper | H04L 9/3247 726/3 |
| 2010/0011238 A1* | 1/2010 | Nakamura | G06F 11/1456 714/5.1 |
| 2012/0054357 A1* | 3/2012 | Kuritzky | H04L 63/083 709/229 |
| 2012/0174198 A1 | 7/2012 | Gould et al. | |
| 2012/0260322 A1* | 10/2012 | Logan | G06F 21/33 726/6 |
| 2013/0246796 A1 | 9/2013 | Lichtenstadt et al. | |
| 2014/0068707 A1* | 3/2014 | Sakura | H04L 63/20 726/1 |
| 2014/0181922 A1 | 6/2014 | Jakobsson | |
| 2014/0359744 A1* | 12/2014 | Hillis | G06F 21/36 726/9 |
| 2015/0178137 A1* | 6/2015 | Gordon | G06F 9/5061 709/226 |
| 2015/0288694 A1 | 10/2015 | Liebl et al. | |
| 2015/0365403 A1* | 12/2015 | Counterman | H04L 63/102 726/9 |
| 2016/0050272 A1 | 2/2016 | Raduchel | |
| 2016/0191544 A1 | 6/2016 | Kim et al. | |
| 2016/0330199 A1* | 11/2016 | Weiner | H04L 63/0853 |
| 2016/0381019 A1* | 12/2016 | Modi | H04L 67/1034 726/4 |
| 2017/0006020 A1 | 1/2017 | Falodiya | |
| 2017/0041963 A1* | 2/2017 | Edge | H04W 4/90 |
| 2017/0201550 A1 | 7/2017 | Benson et al. | |
| 2017/0214683 A1* | 7/2017 | Kroehling | H04L 63/061 |
| 2017/0272419 A1* | 9/2017 | Kumar | H04L 63/06 |
| 2017/0279720 A1 | 9/2017 | Patnaik et al. | |
| 2018/0041488 A1* | 2/2018 | Kohli | H04L 63/20 |
| 2018/0152455 A1 | 5/2018 | Lee et al. | |
| 2018/0234464 A1 | 8/2018 | Sim et al. | |
| 2018/0278607 A1 | 9/2018 | Loladia et al. | |
| 2018/0337920 A1* | 11/2018 | Stites | G06F 21/73 |
| 2018/0349581 A1 | 12/2018 | Ramalingam | |
| 2019/0058700 A1 | 2/2019 | Kurian et al. | |
| 2019/0069010 A1 | 2/2019 | Wang | |
| 2019/0207937 A1 | 7/2019 | Neilan | |
| 2019/0378142 A1 | 12/2019 | Darnell et al. | |
| 2020/0065427 A1 | 2/2020 | Tofighbakhsh | |
| 2020/0162454 A1* | 5/2020 | Jain | H04L 63/0815 |
| 2020/0177385 A1 | 6/2020 | Kumar et al. | |
| 2020/0177589 A1 | 6/2020 | Mangalvedkar et al. | |
| 2021/0021428 A1 | 1/2021 | Landman | |
| 2021/0135869 A1* | 5/2021 | Barhudarian | H04L 9/0891 |
| 2021/0136076 A1 | 5/2021 | Barhudarian et al. | |
| 2021/0136114 A1 | 5/2021 | Barhudarian et al. | |
| 2021/0141923 A1 | 5/2021 | Wu et al. | |
| 2021/0167958 A1* | 6/2021 | Soriente | H04L 63/0281 |
| 2021/0168129 A1* | 6/2021 | Edwards | G06F 21/33 |
| 2021/0209079 A1 | 7/2021 | Lynch et al. | |
| 2021/0226951 A1 | 7/2021 | Goldstein et al. | |
| 2021/0226960 A1* | 7/2021 | Pattar | H04L 63/083 |
| 2021/0234850 A1 | 7/2021 | Vogt | |
| 2021/0243038 A1 | 8/2021 | Wilson | |
| 2021/0367938 A1 | 11/2021 | Praszczalek et al. | |
| 2021/0374684 A1 | 12/2021 | Qiao et al. | |
| 2021/0377044 A1 | 12/2021 | Leibmann et al. | |
| 2022/0029820 A1 | 1/2022 | Mozano et al. | |
| 2022/0067712 A1 | 3/2022 | Sarin | |
| 2022/0123950 A1 | 4/2022 | Erickson et al. | |
| 2022/0141029 A1* | 5/2022 | Dahmen | H04L 9/3231 713/176 |
| 2022/0141220 A1 | 5/2022 | Lind | |
| 2022/0229933 A1 | 7/2022 | Lieb | |
| 2022/0261487 A1 | 8/2022 | Lounsberry | |
| 2022/0276848 A1 | 9/2022 | Garaev et al. | |
| 2022/0309161 A1 | 9/2022 | Bhide et al. | |
| 2022/0366038 A1 | 11/2022 | Summers et al. | |
| 2022/0385646 A1 | 12/2022 | Basu et al. | |
| 2022/0385649 A1 | 12/2022 | Basu et al. | |
| 2023/0199025 A1 | 6/2023 | Xu et al. | |

FOREIGN PATENT DOCUMENTS

| | | | | |
|---|---|---|---|---|
| CN | 107508823 B | * | 2/2020 | ......... H04L 63/0807 |
| EP | 3828742 A1 | * | 6/2021 | .......... G06F 16/955 |
| JP | 2012034170 A | * | 2/2012 | |
| WO | WO-2014176539 A1 | * | 10/2014 | ............. H04L 63/08 |
| WO | WO-2016192608 A2 | * | 12/2016 | ............. H04L 63/08 |

OTHER PUBLICATIONS

"Pippal, High availability of databases for cloud, Mar. 1, 2015, IEEE Conference Paper, pp. 1716-1722." (Year: 2015).*

"What is a Reverse Proxy? | Proxy Servers Explained", Retrieved From: https://web.archive.org/web/20210510122751/https://www.cloudflare.com/learning/cdn/glossary/reverse-proxy/, May 10, 2021, 6 Pages.

Singhal, et al., "Microsoft Identity Platform and OpenID Connect Protocol", Retrieved From: https://docs.microsoft.com/en-us/azure/active-directory/develop/v2-protocols-oidc#/sample-request, May 22, 2020, 9 Pages.

"Notice of Allowance in U.S. Appl. No. 17/334,648", Mailed Date: May 3, 2023, 15 Pages.

"Notice of Allowance Issued in U.S. Appl. No. 17/334,649", Mailed Date: Aug. 16, 2023, 10 Pages.

* cited by examiner

CLIENT DEVICE CAPABLE OF DYNAMICALLY ROUTING AUTHENTICATION REQUESTS TO A BACKUP AUTHENTICATION SYSTEM

BACKGROUND

Authentication of a principal (e.g., user or application) establishes truth of an assertion that an entity is the principal. For instance, such authentication of a principal often is a prerequisite for the principal to gain access to a resource (e.g., server resource) for a designated period of time. Authentication systems typically generate authentication artifacts (e.g., access tokens, identification (ID) tokens, and refresh tokens) that may be used to authenticate principals, and the authentication artifacts may designate the periods of time for which access to the resources is to be granted. During outages of the authentication systems, principals traditionally are not able to authenticate and maintain access to resources after expiration of their previously received authentication artifacts. For example, an authentication artifact typically is issued in real time when requested by a principal. If an authentication system that possesses a key that is used to issue authentication artifacts encounters an outage for even a moment, any principal that requests an authentication artifact in that moment traditionally will not receive the requested authentication artifact and will therefore be unable to access the resource for which authentication was sought.

SUMMARY

Various approaches are described herein for, among other things, dynamically routing an authentication request to a backup authentication system by a client device. For instance, the client device may initially attempt to provide the authentication request to a primary authentication system based on the authentication request indicating that the authentication request is to be provided to the primary authentication system. If the client device does not receive a valid response to the authentication request, the client device may then automatically re-route the authentication request to the backup authentication system, even though the authentication request indicates that the authentication request is to be provided to the primary authentication system. The client device may know to re-route the authentication request to the backup authentication system based on the backup authentication system being included in a list of authorized recipients of authentication requests from the client device. For instance, the client device may store the list prior to the initial attempt to provide the authentication request to the primary authentication system in case the initial attempt does not result in a valid response.

In an example approach of dynamically routing an authentication request to a backup authentication system by a client device, a list, which identifies authentication systems that are authorized to respond to authentication requests from the client device, is stored at the client device. The authentication request is sent from the client device toward a primary authentication system based at least in part on the authentication request identifying the primary authentication system as a recipient of the authentication request. The authentication request requests authentication of a principal by the primary authentication system. The backup authentication system, which is isolated from the primary authentication system, is caused, by the client device, to authenticate the principal using an authentication package received from the primary authentication system by dynamically routing the authentication request to the backup authentication system based at least in part on not receiving a valid response to the authentication request at the client device from the primary authentication system and further based at least in part on the list identifying the backup authentication system among the plurality of authentication systems that are authorized to respond to authentication requests from the client device. For instance, authentication of the principal using the authentication package may be based at least in part on a first principal identifier in the authentication package that identifies the principal corresponding to a second principal identifier in the authentication request that identifies the principal and may be further based at least in part on a credential of the principal in the authentication request being verified using credential verification information in the authentication package that is usable to verify the credential.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
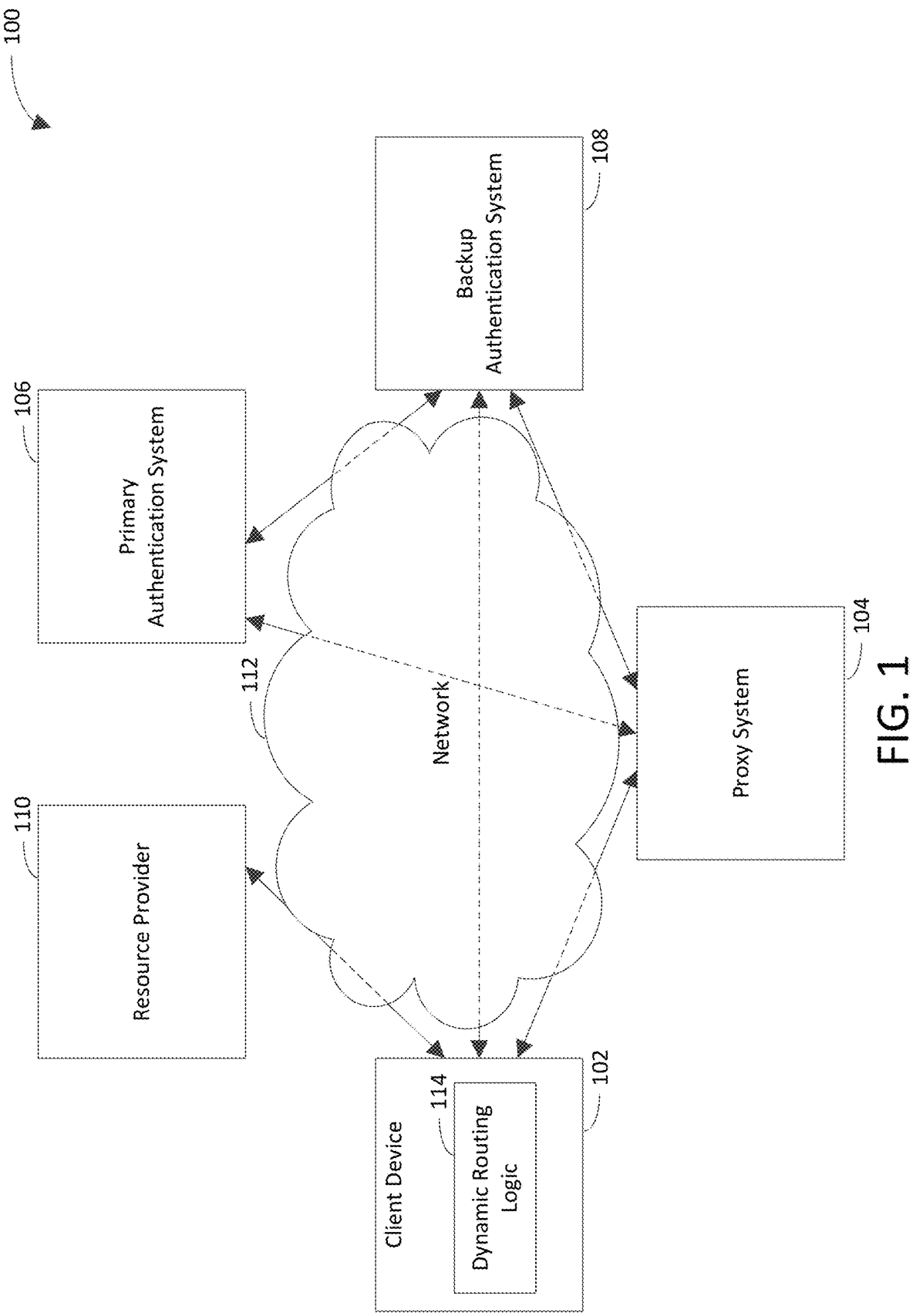
FIG. 1 is a block diagram of an example dynamic routing system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of dynamically routing an authentication request to a backup authentication system by a client device. For instance, the client device may initially attempt to provide the authentication request to a primary authentication system based on the authentication request indicating that the authentication request is to be provided to the primary authentication system. If the client device does not receive a valid response to the authentication request, the client device may then automatically re-route the authentication request to the backup authentication system, even though the authentication request indicates that the authentication request is to be provided to the primary authentication system. The client device may know to re-route the authentication request to the backup authentication system based on the backup authentication system being included in a list of authorized recipients of authentication requests from the client device. For instance, the client device may store the list prior to the initial attempt to provide the authentication request to the primary authentication system in case the initial attempt does not result in a valid response.

Example techniques described herein have a variety of benefits as compared to conventional techniques for authenticating a principal. For instance, the example techniques may enable a principal to be authenticated even if a primary authentication system is not capable of providing a valid response to an authentication request. By dynamically routing the authentication request to a backup authentication system that stores an authentication package received from the primary authentication system, availability and reliability of an authentication system that includes the primary authentication system and the backup authentication system may be increased. For instance, the example techniques may reduce a likelihood that the authentication system is to experience an outage. The backup authentication system may be isolated from the primary authentication system. For example, the primary authentication system and the backup authentication system may be hosted on different (e.g., separate) clouds and/or in different regions of the world.

The example techniques may reduce an amount of time and/or resources (e.g., processor cycles, memory, network bandwidth) that is consumed to obtain authentication of principals in a networked environment and/or to perform operations that rely on such authentication. For instance, by avoiding multiple attempts to authenticate a principal due to an outage of the authentication system, a computing system (e.g., the client device or a proxy system) may conserve the time and resources that would have been consumed by the computing system to execute the additional attempts. The example techniques may thereby reduce a cost associated with obtaining authentication of the principals and/or performing the operations that rely on the authentication.

The example techniques may increase speed and/or efficiency of a computing system by eliminating delays caused by a failure of an authentication system to provide a valid response to an authentication request provided by the computing system. The example techniques may improve (e.g., increase) a user experience and/or increase efficiency of a principal that seeks authentication for purposes of accessing a resource, for example, by more reliably providing such authentication. For instance, by more reliably providing authentication of the principal, an amount of the principal's time that would have been consumed to seek and obtain authentication may be reduced.

FIG. 1 is a block diagram of an example dynamic routing system 100 in accordance with an embodiment. Generally speaking, the dynamic routing system 100 operates to provide information to principals in response to requests (e.g., hypertext transfer protocol (HTTP) requests) that are received from the principals. For instance, a principal may be a user or an application. The information may include documents (Web pages, images, audio files, video files, etc.), output of executables, and/or any other suitable type of information. In accordance with example embodiments described herein, the dynamic routing system 100 enables a backup authentication system 108 to use an authentication package from a primary authentication system 106 to provide authentication services to principals even if the primary authentication system 106 is unable to provide valid (e.g., error-free) responses to authentication requests from those principals.

As shown in FIG. 1, the dynamic routing system 100 includes a client device 102, a proxy system 104, the primary authentication system 106, the backup authentication system 108, a resource provider 110, and a network 112. Communication among the client device 102, the proxy system 104, the primary authentication system 106, the backup authentication system 108, and the resource provider 110 is carried out over the network 112 using well-known network communication protocols. The network 112 may be a wide-area network (e.g., the Internet), a local area network (LAN), another type of network, or a combination thereof.

The client device 102 is a processing system that is capable of communicating directly or indirectly with the proxy system 104, the primary authentication system 106, the backup authentication system 108, and the resource provider 110. An example of a processing system is a system that includes at least one processor that is capable of manipulating data in accordance with a set of instructions. For instance, a processing system may be a computer, a personal digital assistant, etc. The client device 102 is configured to provide authentication requests to the primary authentication system 106 and/or the backup authentication system 108 (e.g., via the proxy system 104) for requesting authentication artifacts that may be used to access resources provided by the resource provider 110. Examples of a resource include but are not limited to a document (Web page, image, audio file, video file, etc.) and an output of an executable. For instance, a user may initiate a request to access a resource (a.k.a. a resource request) using a client (e.g., a Web browser, Web crawler, or other type of client) deployed on the client device 102 that is owned by or otherwise accessible to the user. It will be recognized that the resource request need not necessarily be initiated by a user of the client device 102. For instance, the resource request may be initiated by an application that executes on the client device 102.

Regardless, when the client device 102 detects initiation of the resource request, the client device 102 may seek and obtain an authentication artifact (e.g., an ID token and/or an access token) from the primary authentication system 106 or the backup authentication system 108. For example, the client device 102 may provide credential(s) of the principal to the primary authentication system 106 or the backup authentication system 108 to obtain the authentication artifact. In accordance with this example, the client device 102 may receive the authentication artifact after the primary authentication system 106 or the backup authentication system 108 validates the identity and credential(s) of the principal. Upon receipt of the authentication artifact, the client device 102 may forward the authentication artifact to the resource provider 110 to gain access to the requested resource. In accordance with some example embodiments, the client device 102 is capable of accessing domains (e.g., Web sites) hosted by the resource provider 110, so that the client device 102 may access information that is available via the domains. Such domain may include Web pages, which may be provided as hypertext markup language (HTML) documents and objects (e.g., files) that are linked therein, for example.

The client device 102 may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like.

The client device 102 includes dynamic routing logic 114. The dynamic routing logic 114 is configured to dynamically route an authentication request to the backup authentication system 108. The dynamic routing logic 114 stores a list, which identifies multiple authentication systems that are authorized to respond to authentication requests from the client device 102. The dynamic routing logic 114 sends the authentication request from the client device 102 toward the primary authentication system 106 based at least in part on the authentication request identifying the primary authentication system 106 as a recipient of the authentication request. The authentication request requests authentication of a principal by the primary authentication system 106. The dynamic routing logic 114 causes the backup authentication system 108, which may be isolated from the primary authentication system 106, to authenticate the principal using an authentication package received from the primary authentication system 108 by dynamically routing the authentication request to the backup authentication system 108 based at least in part on not receiving a valid response to the authentication request at the client device 102 from the primary authentication system 106 and further based at least in part on the list identifying the backup authentication system 108 among the authentication systems that are authorized to respond to authentication requests from the client device 102. For instance, the dynamic routing logic 114 may cause the backup authentication system 108 to authenticate the principal using the authentication package based at least in part on a first principal identifier in the authentication package that identifies the principal corresponding to (e.g., matching, being same as) a second principal identifier in the authentication request that identifies the principal and further based at least in part on a credential of the principal in the authentication request being verified using credential verification information in the authentication package that is usable to verify the credential.

The authentication package may include an authentication artifact and metadata. The dynamic routing logic 114 may be configured to cause the backup authentication system 108 to authenticate the principal using the metadata in the authentication package (e.g., based at least in part on the first principal identifier in the metadata that identifies the principal corresponding to the second principal identifier in the authentication request that identifies the principal and further based at least in part on the credential of the principal in the authentication request being verified using the credential verification information in the metadata that is usable to verify the credential). The dynamic routing logic 114 may receive the artifact from the backup authentication system 108 as a result of causing the backup authentication system 108 to authenticate the principal. The dynamic routing logic 114 may forward the artifact to the client device 104 so that the client device 104 may use the artifact to obtain access to a resource stored by the resource provider 110.

The dynamic routing logic 114 may be implemented in various ways to dynamically route an authentication request to a backup authentication system 108, including being implemented in hardware, software, firmware, or any combination thereof. For example, the dynamic routing logic 114 may be implemented as computer program code configured to be executed in one or more processors. In another example, at least a portion of the dynamic routing logic 114 may be implemented as hardware logic/electrical circuitry. For instance, at least a portion of the dynamic routing logic 114 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

Each of the proxy system 104, the primary authentication system 106, the backup authentication system 108, and the resource provider 110 is a processing system that is capable of communicating directly or indirectly with the client device 102. For instance, the primary authentication system 106 and the backup authentication system 108 may communicate with the client device 102 via the proxy system 104, as discussed in further detail below.

The proxy system 104 serves as an intermediary between the client device 102 and the primary authentication system 106 and between the client device 102 and the backup authentication system 108. For instance, the proxy system 104 may intercept authentication requests that are sent from the client device 102 toward the primary authentication system 106 or from the client device 102 toward the backup authentication system 108. The proxy system 104 may forward each authentication request toward its intended destination (e.g., the primary authentication system 106 or the backup authentication system 108, as identified in the authentication request), or the proxy system 104 may route the authentication request to another destination (e.g., whichever of the primary authentication system 106 and the backup authentication system 108 is not identified in the authentication request), depending on circumstances. For instance, the proxy system 104 may be configured to route authentication requests to the primary authentication system 106 as a default destination. The proxy system 104 may be configured to route an authentication request to the backup authentication system 108 based on (e.g., based at least in part on) the primary authentication system 106 being incapable of providing a valid response to the authentication request. The proxy system 104 may be any suitable type of proxy system. Example types of a proxy system include but are not limited to a reverse proxy system, a middle-of-the-network proxy system, and a forward proxy system. The proxy system 104 may be a break-and-inspect proxy system, which is capable of performing secure sockets layer (SSL) breaks.

The primary authentication system 106 is configured to selectively provide authentication artifacts in response to authentication requests that are received by the primary authentication system 106 based on one or more criteria. For instance, the primary authentication system 106 may verify a credential of a principal that is included in an authentication request and compare a first principal identifier that is included in the authentication request and a second principal identifier that is associated with an authentication artifact to determine whether the authentication artifact is to be provided in response to the authentication request. The primary authentication system 106 may be configured to provide the authentication artifact based on the credential of the principal being verified and the first principal identifier corresponding to the second principal identifier. The primary authentication system 106 may be configured to not provide the authentication artifact based on the credential of the principal not being verified and/or the first principal identifier not corresponding to the second principal identifier.

The primary authentication system 106 is further configured to generate authentication package(s) to be provided to the backup authentication system 108. For instance, the primary authentication system 106 may provide an authentication package to the backup authentication system 108 while the primary authentication system 106 is capable of providing valid responses to authentication requests. The authentication package may enable the backup authentication system 108 to generate valid responses to authentication requests based on the primary authentication system 106 becoming unable to do so.

The primary authentication system 106 may be incapable of providing valid responses to authentication requests for any of a variety of reasons, including but not limited to the primary authentication system 106 being inoperable or unreachable; a load of the primary authentication system 106 being greater than or equal to a load threshold; a dependency of the primary authentication system 106 that includes information (e.g., information about the principal) that is necessary for authentication being incapable of providing a valid response to a request for the information from the primary authentication system 106; performance of the primary authentication system 106 being less than or equal to a performance threshold (e.g., response time or delay being greater than or equal to a threshold); the primary authentication system 106 generating a designated error code; an engineer pressing a button to indicate that the primary authentication system 106 is incapable of providing a valid response to authentication requests; a criterion for establishing a connection between the proxy system 104 and the primary authentication system 106 not being satisfied; functionality of the primary authentication system 106 being blocked due to a security issue; a number of errors experienced by the primary authentication system 106 being greater than or equal to an error threshold; and the primary authentication system 106 being unreachable a number of times that is greater than or equal to a threshold number of times.

Each authentication package (e.g., an authentication artifact therein) may be valid (e.g., usable by the backup authentication system 108 for purposes of authenticating the principal) for a designated period of time. Accordingly, the authentication package may expire at the end of the designated period of time. The primary authentication system 106 may periodically generate and provide new authentication packages to the backup authentication system 108. For instance, the primary authentication system 106 may provide each successive authentication package to the backup authentication system 108 prior to expiration of the preceding authentication package. This may ensure that the backup authentication system 108 continuously has a valid authentication package with which the backup authentication system 108 may authenticate the principal. For instance, the primary authentication system 106 may provide a new authentication package to the backup authentication system 108 at any suitable rate (e.g., once per day, no more frequently than once per day, or once every two days). Each new authentication package may be valid for any suitable period of time (e.g., two days, three days, or four days).

The backup authentication system 108 is configured to selectively provide authentication artifacts in response to authentication requests that are received by the backend authentication system 108 based on one or more criteria. For instance, the backend authentication system 108 may verify a credential of a principal that is included in an authentication request and compare a first principal identifier that is included in an authentication request and a second principal identifier that is associated with an authentication artifact to determine whether the authentication artifact is to be provided in response to the authentication request. The backend authentication system 108 may be configured to provide the authentication artifact based on the credential of the principal being verified and the first principal identifier corresponding to the second principal identifier. The backend authentication system 108 may be configured to not provide the authentication artifact based on the credential of the principal not being verified and/or the first principal identifier not corresponding to the second principal identifier.

The backup authentication system 108 is configured to store authentication package(s) that are received from the primary authentication system 106. Each authentication package may include an authentication artifact and metadata that is associated with the authentication artifact. The authentication artifact in each authentication package includes claim(s) that are usable to authenticate the principal that is identified by the metadata in the authentication package. Each authentication artifact may be signed with a cryptographic key by the primary authentication system 106. It should be noted that the primary authentication system 106 may be the only entity that is capable of signing authentication artifacts with the cryptographic key. For example, the backup authentication system 108 may not be capable of signing authentication artifacts with the cryptographic key. In accordance with this example, the backup authentication system 108 may not have access to the cryptographic key. It will be recognized that the backup authentication system 108 may perform security and validation checks on each authentication artifact to verify that the authentication artifact is not corrupted when it is received from the primary authentication system and that the authentication artifact is trustworthy to the principal.

In an example, the backup authentication system 108 may receive the authentication package(s) directly from the primary authentication system 106 (e.g., without being intercepted by another entity). In another example, the backup authentication system 108 may receive the authentication package(s) indirectly from the primary authentication system 106. In accordance with this example, the authentication package(s) may be received via the proxy system 104 or from a store in which the primary authentication system 106 stores the authentication package(s). Each of the authentication package(s) may be encrypted or unencrypted. For instance, any one or more of the authentication package(s) may be encrypted with a public key of a key pair or with a symmetric key. The backup authentication system 108 may decrypt each authentication package that is encrypted with a public key of a key pair using a private key of the key pair. The backup authentication system 108 may decrypt each authentication package that is encrypted with a symmetric key using the symmetric key.

The backup authentication system 108 may be isolated from the primary authentication system 106, though the example embodiments are not limited in this respect. For example, the primary authentication system 106 and the backup authentication system 108 may be in different clouds and/or in different parts of the world. For instance, a cloud that hosts the primary authentication system 106 and a cloud that hosts the backup authentication system 108 may be decorrelated (e.g., have no reciprocal relationship). In another example, the cloud that hosts the primary authentication system 106 may be located (e.g., contained) in a first geographical region, and the cloud that hosts the backup authentication system 108 may be located in a second geographical region that is different from the first geographical region. For instance, the first and second geographical regions may be first and second continents, first and second countries, first and second states, first and second counties, or first and second cities.

The primary authentication system 106 and the backup authentication system 108 may be incorporated into a cloud computing service, though the scope of the example embodiments is not limited in this respect. A cloud computing service is a service that executes at least in part in the cloud. The cloud may be a remote cloud, an on-premises cloud, or a hybrid cloud. It will be recognized that an on-premises cloud may use remote cloud services. Examples of a cloud computing service include but are not limited to Azure® developed and distributed by Microsoft Corporation, Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., and Rackspace® developed and distributed by Rackspace US, Inc.

The resource provider 110 is configured to selectively provide access to a resource depending on whether a requisite authentication artifact is received by the resource provider 110. For instance, the resource provider 110 may receive a request to access the resource from the client device 102. The request may include an authentication artifact that the client device received from the primary authentication system 106 or the backup authentication system 108. The resource provider 110 may verify the authentication artifact (e.g., decrypt the authentication artifact or compare the authentication artifact to a reference authentication artifact to determine that the client device 102 is to be granted access to the resource). The resource provider 110 may be configured to grant the client device 102 access to the resource based on the authentication artifact being verified. The resource provider 110 may be configured to deny the client device 102 access to the resource based on the authentication artifact that is included in the request not corresponding to the reference authentication artifact.

Figure 2:
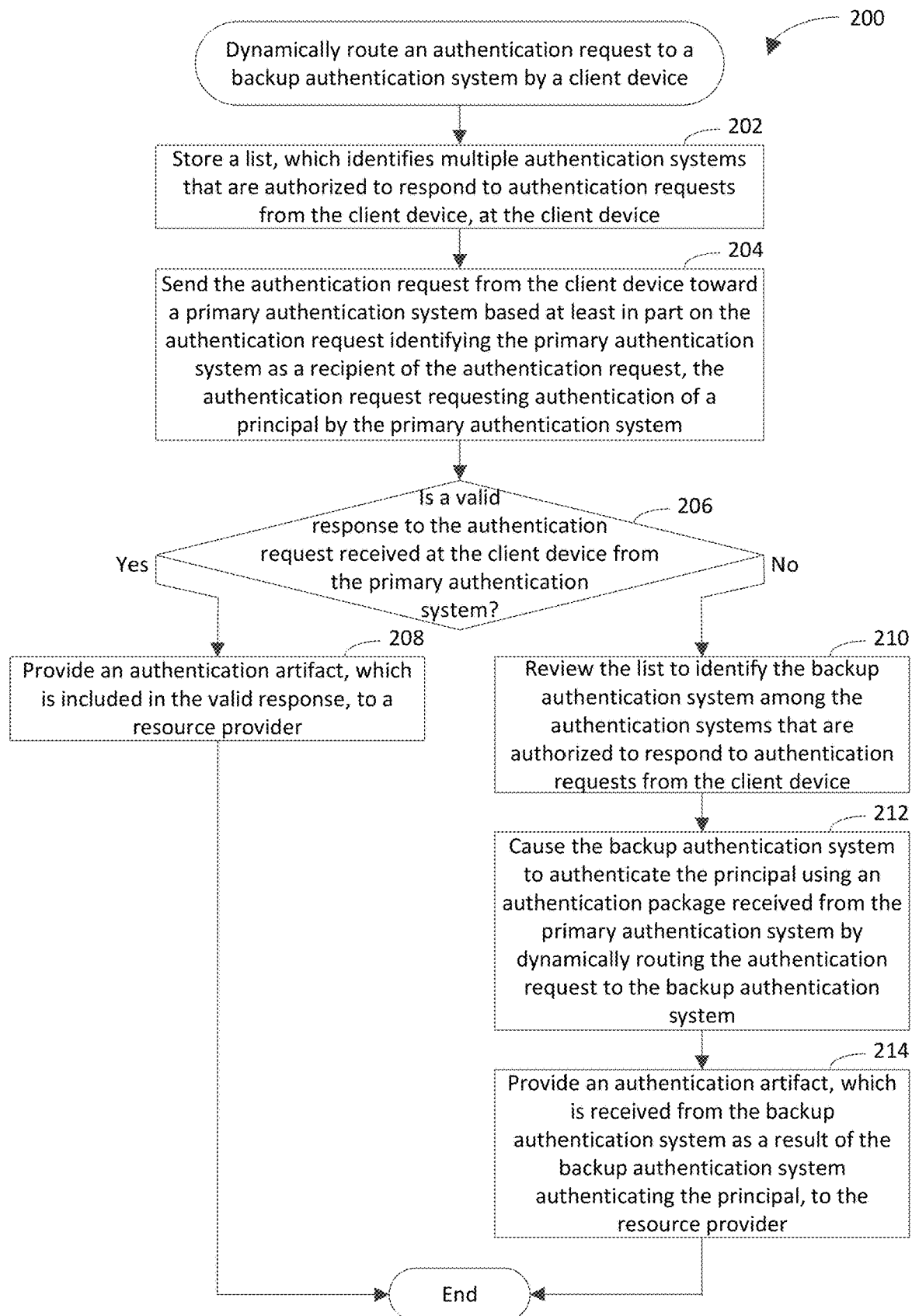
FIG. 2 depicts a flowchart of an example method for dynamically routing an authentication request to a backup authentication system by a client device in accordance with an embodiment.
Figure 3:
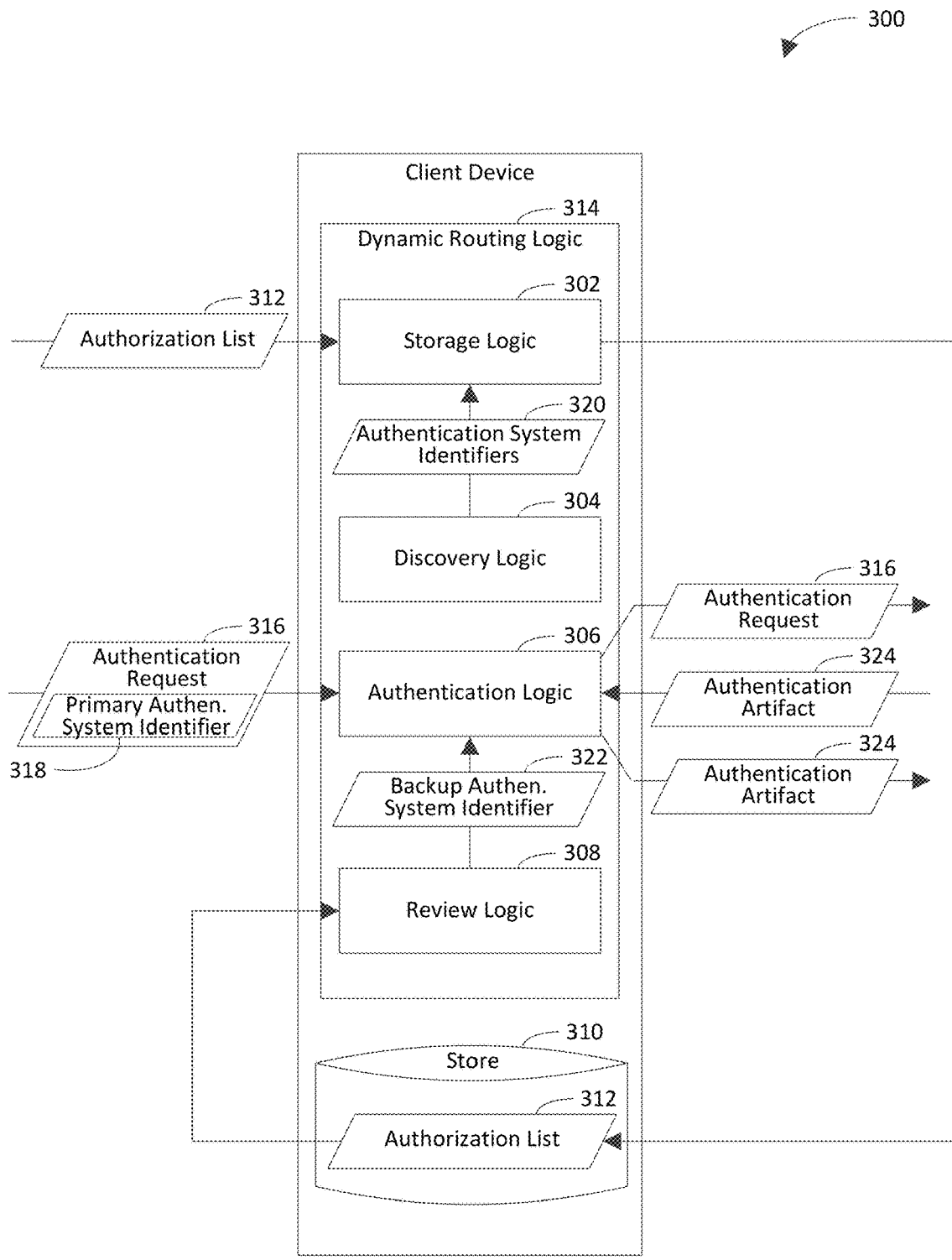
FIG. 3 is a block diagram of an example implementation of a client device shown in FIG. 1 in accordance with an embodiment.

FIG. 2 depicts a flowchart 200 of an example method for dynamically routing an authentication request to a backup authentication system by a client device in accordance with an embodiment. Flowchart 200 may be performed by the client device 102 shown in FIG. 1, for example. For illustrative purposes, flowchart 200 is described with respect to client device 300 shown in FIG. 3, which is an example implementation of the client device 102. As shown in FIG. 3, the client device 300 includes dynamic routing logic 314 and a store 310. The dynamic routing logic 314 includes storage logic 302, discovery logic 304, authentication logic 306, and review logic 308. The store 310 may be any suitable type of store. One type of store is a database. For instance, the store 310 may be a relational database, an entity-relationship database, an object database, an object relational database, an extensible markup language (XML) database, etc. The store 310 is shown to store an authorization list 312. Further structural and operational embodiments will be apparent to persons skilled in the relevant art(s) based on the discussion regarding flowchart 200.

As shown in FIG. 2, the method of flowchart 200 begins at step 202. In step 202, a list, which identifies multiple authentication systems that are authorized to respond to authentication requests from the client device, is stored at the client device. For example, the list may include uniform resource identifiers (URIs) of the respective authentication systems that are authorized to respond to authentication requests from the client device. In accordance with this example, each uniform resource identifier may be a uniform resource locator (URL) or a uniform resource name (URN). In an example implementation, the storage logic 302 stores an authorization list 312, which identifies authentication systems that are authorized to respond to authentication requests from the client device 300, in the store 310. For example, the storage logic 302 may receive the authorization list 312 from an entity that is external to the client device 300. For instance, a primary authentication system (e.g., primary authentication system 106) may publish the list. In accordance with this example, the list may publish and therefore become available to the client device 300 while the primary authentication system is capable of providing a valid response to authentication requests from the client device. In another example, the storage logic 302 may generate the authorization list 312. In accordance with this example, the discovery logic 304 may perform a discovery operation to identify the authentication systems that are authorized to respond to authentication requests from the client device 300. The discovery operation may be performed in accordance with a federated identity protocol, though the scope of the example embodiments is not limited in this respect. Examples of a federated identity protocol include but are not limited to an OAuth 2.0 protocol, an Open ID Connect (OIDC) protocol, a SAML protocol, a Web Services Federation (WS-Federation) protocol, and a WS-Trust protocol. In accordance with this example, the discovery logic 304 may generate authentication system identifiers 320 to specify the authentication systems that are authorized to respond to authentication requests from the client device 300, as identified by performing the discovery operation. In further accordance with this example, the storage logic 302 may generate the authorization list 312 based on the authentication system identifiers 320.

At step 204, the authentication request is sent from the client device toward a primary authentication system based at least in part on the authentication request identifying the primary authentication system as a recipient of the authentication request. The authentication request requests authentication of a principal by the primary authentication system. The principal may be any suitable entity that is capable of identifying itself. For instance, the principal may be a user (e.g., a user of the client device 102), an application (e.g., an application that executes on the client device 102), or a computing device (e.g., the client device 102). In an example implementation, the authentication logic 306 sends the authentication request 316 toward the primary authentication system based at least in part on the authentication request 316 identifying the primary authentication system as a targeted destination of the authentication request 316. The authentication request 316 requests that the primary authentication system authenticate a principal that is identified in the authentication request 316. In an example, the authentication request 316 may include a primary authentication system identifier 318, which identifies the primary authentication system as a recipient of the authentication request 316. In accordance with this example, the authentication logic 306 may analyze the authentication request 316 to discover the primary authentication system identifier 318 therein. In further accordance with this example, the authentication logic 306 may send the authentication request 316 toward the primary authentication system based on the primary authentication system identifier 318 identifying the primary authentication system as a recipient of the authentication request 316.

At step 206, a determination is made whether a valid response to the authentication request is received at the client device form the primary authentication system. If a valid response to the authentication request is received at the client device form the primary authentication system, flow continues to step 208. Otherwise, flow continues to step 210. For instance, a valid response may not be received at the client device from the primary authentication system within a designated amount of time that begins at a time instance at which the authentication request is sent toward the primary authentication system by the client device. In an example implementation, the authentication logic 306 determines whether a valid response to the authentication request 316 is received at the client device 300 from the primary authentication system. For instance, the authentication logic 306 may monitor inputs to the client device 300 to determine whether a valid response to the authentication request 316 has been received. For example, a valid response may include an authentication artifact 324. In accordance with this example, the authentication logic 306 may determine that a valid response has been received based on the client device 900 receiving an authentication artifact (e.g., the authentication artifact 324) in response to the authentication request 316. In further accordance with this example, the authentication logic 306 may determine that a valid response has not been received based on the client device 900 not receiving an authentication artifact (e.g., the authentication artifact 324) in response to the authentication request 316.

At step 208, an authentication artifact, which is included in the valid response, is provided to a resource provider. Upon completion of step 208, flowchart 200 ends. In an example implementation, the authentication logic 306 provides the authentication artifact 324, which is included in the valid response, to the resource provider. For instance, the authentication logic 306 may receive the valid response and analyze the valid response to identify the authentication artifact 324 therein.

At step 210, the list is reviewed to identify the backup authentication system among the authentication systems that are authorized to respond to authentication requests from the client device. The authentication systems in the list may include primary authentication system in addition to the backup authentication system. In an example implementation, the review logic 308 reviews the authentication list 312 to identify the backup authentication system among the authentication systems that are authorized to respond to authentication requests from the client device 300. For instance, the review logic 308 may traverse the authorization list 312 to identify an identifier of the backup authentication system among identifiers of the respective authentication systems that are authorized to respond to authentication requests from the client device 300. In accordance with this implementation, the review logic 308 may provide a backup authentication system identifier 322, which identifies the backup authentication system, to the authentication logic 306 based on the backup authentication system being identified in the review of the authentication list 312.

At step 212, the backup authentication system is caused to authenticate the principal using an authentication package received from the primary authentication system by dynamically routing the authentication request to the backup authentication system. It will be recognized that the backup authentication system may be isolated from the primary authentication system. The authentication package includes a first principal identifier and credential verification information. The first principal identifier identifies the principal. The credential verification information is usable to verify a credential of the principal. The authentication request includes a second principal identifier and the credential of the principal. The second principal identifier identifies the principal. The credential may be issued to the principal by the primary authentication system. The credential may be encrypted and/or cryptographically signed (e.g., tamper-proof) by the primary authentication system, though the scope of the example embodiments is not limited in this respect.

The credential of the principal may be any suitable type of credential, including but not limited to a biometric-based credential, a behaviometric-based credential, a knowledge-based credential, and an ownership-based credential. A biometric-based credential is a measurement or calculation of a physiological characteristic of a user. Examples of a physiological characteristic of a user include but are not limited to a face, hand, palm veins, palmprint, fingerprint, DNA, iris, and retina of the user. A measurement or calculation of a characteristic may indicate one or more dimensions of the characteristic (e.g., one or more dimensions of a feature of the characteristic or a spacing between multiple features of the characteristic). For instance, if a physiological characteristic of a user is the user's fingerprint, the biometric-based credential associated with the user's fingerprint may include a mapping of the ridges in the fingerprint. A behaviometric-based credential is a credential that indicates a pattern of behavior of a user. Examples of a pattern of behavior of a user include but are not limited to a voice, gait, and pattern of key press intervals (a.k.a. typing rhythm) of the user. A knowledge-based credential is something a user knows. Examples of a knowledge-based credential include but are not limited to a password or a portion thereof, pass phrase, personal identification number (PIN), challenge response, and security question. An ownership-based credential is a credential obtained from something a user has. Examples of something the user has (or may have) include but are not limited to a smartcard, wrist band, ID card, security token, device implanted under the user's skin, software token, cell phone (having a built-in hardware token or storing a software token), and hardware authentication device (e.g., YubiKey®).

The authentication request may include a single communication or multiple communications. For example, the credential of the principal and the second principal identifier may be sent to the backup authentication system simultaneously by the client device in a single communication. For instance, the credential may include the second principal identifier (e.g., an encrypted version of the second principal identifier). In another example, the credential of the principal and the second principal identifier may be sent to the backup authentication system by the client device in separate communications. In accordance with this example, a first communication sent by the client device may include the second principal identifier. In further accordance with this example, an inquiry may be provided to the principal by the client device (e.g., via a user interface), requesting the credential as a result of the first communication being sent. For instance, the inquiry may be received from the backup authentication system at the client device (e.g., via the proxy system) and forwarded to the principal by the client device. In further accordance with this example, the client device may receive a second communication that includes the credential from the principal in response to the inquiry and forward the second communication to the backup authentication system.

The backup authentication system's authentication of the principal using the authentication package, which is caused by the client device dynamically routing the authentication request to the backup authentication system, is based at least in part on the first principal identifier in the authentication package corresponding to the second principal identifier in the authentication request and is further based at least in part on the credential of the principal in the authentication request being verified using the credential verification information in the authentication package.

In an example implementation, the authentication logic 306 causes the backup authentication system to authenticate the principal using the authentication package by dynamically routing the authentication request 316 to the backup authentication system. For instance, the authentication logic 306 may cause the backup authentication system to authenticate the principal using the authentication package based at least in part on a first principal identifier in the authentication package that identifies the principal corresponding to a second principal identifier in the authentication request 316 that identifies the principal and further based at least in part on a credential of the principal in the authentication request 316 being verified using credential verification information in the authentication package that is usable to verify the credential.

The credential of the principal may be verified using the credential verification information in any of a variety of ways. For example, the credential may be an encrypted credential (e.g., refresh token or password). In an aspect of this example, the credential verification information may include a key that is configured to decrypt the encrypted credential. In another aspect of this example, the credential verification information may include a description of the credential, which enables the backup authentication system to identify the key that is to be used to decrypt the encrypted credential. In further accordance with this example, the credential of the principal may be verified by decrypting the encrypted credential with the key that is included in the credential verification information or that is identified based on the credential verification information to reveal the unencrypted credential. In an example embodiment, the key that is used to decrypt the encrypted credential is possessed by only the primary authentication system and the backup authentication system. In accordance with this embodiment, only the primary authentication system and the backup authentication system are capable of using the key to decrypt the encrypted credential.

In another example, the credential may be an encrypted version of the second principal identifier (e.g., refresh token or password). In an aspect of this example, the credential verification information may include a key that is configured to decrypt the encrypted version of the second principal identifier. In another aspect of this example, the credential verification information may include a description of the second principal identifier, which enables the backup authentication system to identify the key that is to be used to decrypt the encrypted version of the second principal identifier. In further accordance with this example, the credential of the principal may be verified by decrypting the encrypted version of the second principal identifier with the key that is included in the credential verification information or that is identified based on the credential verification information to reveal the second principal identifier. The key that is used to decrypt the encrypted version of the second principal identifier may be possessed by only the primary and backup authentication systems such that only the primary and backup authentication systems are capable of using the key to decrypt the encrypted version of the second principal identifier, though the scope of the example embodiments is not limited in this respect.

In an example embodiment, the keys described in the examples above are usable by the backup authentication system for purposes of decryption and not for purposes of encryption. In accordance with this embodiment, the backup authentication system is not able to generate its own version of a credential using a key that is usable to decrypt an encrypted version of the credential. In another example embodiment, the keys described in the examples above are usable by the backup authentication system for purposes of decryption and for purposes of encryption. In accordance with this embodiment, the backup authentication system is able to generate its own version of a credential using a key that is usable to decrypt an encrypted version of the credential.

In yet another example, the credential of the principal may be a hashed credential (e.g., refresh token or password). In accordance with this example, the credential verification information may include a hash of the credential (or the credential that is then hashed by the backend authentication system to provide the hashed credential). Accordingly, the credential of the principal may be verified by comparing the hashed credential in the authentication request to the hashed credential that is included in or derived from the credential verification information to confirm that the aforementioned hashed credentials are same.

In an example embodiment, the authentication package includes an authentication artifact. The authentication artifact is signed with a cryptographic key that belongs to the primary authentication system. For instance, the authentication artifact may be signed with the cryptographic key by the primary authentication system. The authentication artifact includes one or more claims that are usable to authenticate the principal. For instance, the authentication artifact may indicate an identity of the principal and/or an access permission of the principal. An access permission of the principal indicates whether the principal is authorized to perform an action (e.g., access, modify, delete) with regard to a resource. The authentication artifact may be an authentication token, a security assertion markup language (SAML) assertion, etc. that is generated by the primary authentication system based on (e.g., using) a cryptographic key. For example, the cryptographic key on which the authentication artifact is based may be controlled by the primary authentication system. In accordance with this example, the cryptographic key may be owned by or under exclusive control of the primary authentication system. The cryptographic key on which the authentication artifact is based and the cryptographic key with which the authentication artifact is signed may be same or different. Any one or more of the claim(s) in the authentication artifact may be configured to enable (e.g., trigger) authentication of the principal.

In accordance with this embodiment, the authentication package further includes metadata associated with the authentication artifact. The metadata includes the credential verification information, which is usable to verify the credential of the principal. For instance, the credential verification information may identify the credential of the principal in a secure manner and include enough information to enable the backup authentication system to verify the credential. The metadata further includes the first principal identifier that identifies the principal. For instance, the first principal identifier may be a username of the principal or a token that is issued to the principal by the primary authentication system. The metadata may indicate what the authentication artifact is, what the authentication artifact contains, how the authentication artifact is to be stored, a lifetime (e.g., duration of usability or effectiveness) of the authentication artifact, and so on. The authentication package may be signed with a second cryptographic key by the primary authentication system and/or encrypted by the primary authentication system.

In another example embodiment, metadata in the authentication package indicates a range of internet protocol (IP) addresses in which an IP address of the principal is to be included as a criterion for authentication of the principal using the authentication package. In accordance with this embodiment, causing the backup authentication system to authenticate the principal at step 212 is further based at least in part on the IP address of the principal, as indicated by the authentication request, being included in the range of IP addresses.

In yet another example embodiment, causing the backup authentication system to authenticate the principal at step 212 includes causing, by the client device, the backup authentication system to request an authentication artifact from the primary authentication system and to authenticate the principal using the authentication package, which is received from the primary authentication system prior to the request, as a result of the authentication artifact not being received from the primary authentication system in response to the request.

In still another example embodiment, causing the backup authentication system to authenticate the principal at step 212 is performed in accordance with a federated identity protocol. Examples of a federated identity protocol include but are not limited to an OAuth 2.0 protocol, an Open ID Connect (OIDC) protocol, a SAML protocol, a Web Services Federation (WS-Federation) protocol, and a WS-Trust protocol. For instance, the authentication request may be sent toward the primary authentication system at step 204 and routed to the backup authentication system at step 212 in accordance with a common (e.g., same) federated identity protocol. The authentication request may be sent toward the primary authentication system at step 204 using a hostname, URI, etc. of the primary authentication system, and the authentication request may be dynamically routed to the backup authentication system at step 212 using a hostname, URI, etc. of the backup authentication system.

In another example embodiment, causing the backup authentication system to authenticate the principal at step 212 includes executing, by the client device, a library that dynamically routes the authentication request to the backup authentication system based at least in part on a determination by the library that the list identifies the backup authentication system among the authentication systems that are authorized to respond to authentication requests from the client device.

At step 214, an authentication artifact, which is received from the backup authentication system as a result of the backup authentication system authenticating the principal, is provided to the resource provider. In an example implementation, the authentication logic 306 provides the authentication artifact (e.g., authentication artifact 324), which is received from the backup authentication system as a result of the backup authentication system authenticating the principal, to the resource provider. For instance, the authentication logic 306 may cause the client device 300 to gain access to a resource that is identified by the authentication artifact 324 by providing the authentication artifact 324 to the resource provider.

In an example embodiment, sending the authentication request from the client device toward the primary authentication system at step 204 includes sending the authentication request from the client device toward the primary authentication system through a proxy system that is coupled between the client device and the backup authentication system. For instance, the authentication logic 306 may send the authentication request 316 toward the primary authentication system 106 through the proxy system 104 that is coupled between the client device 300 and the backup authentication system 108. In accordance with this embodiment, causing the backup authentication system to authenticate the principal at step 212 includes dynamically routing the authentication request from the client device to the backup authentication system without routing the authentication request through the proxy system. For example, the authentication logic 306 may route the authentication request 316 directly to the backup authentication system 108.

In some example embodiments, one or more steps 202, 204, 206, 208, 210, 212, and/or 214 of flowchart 200 may not be performed. Moreover, steps in addition to or in lieu of steps 202, 204, 206, 208, 210, 212, and/or 214 may be performed. For instance, in an example embodiment, the method of flowchart 200 further includes sending a second authentication request, which requests authentication of the principal by the backup authentication system, to the backup authentication system. For example, the second authentication request may include an IP address of the backup authentication system to indicate that the second authentication request is directed to the backup authentication system. In an aspect, the authentication logic 306 may send the second authentication request to the backup authentication system. In accordance with this embodiment, sending the second authentication request to the backup authentication system causes the backup authentication system to request an authentication artifact from the primary authentication system and to authenticate the principal using the authentication artifact received from the primary authentication system, rather than (e.g., in lieu of) using the authentication package, in response to the second authentication request.

In another example embodiment, the method of flowchart 200 further includes discovering the authentication systems that are authorized to respond to authentication requests from the client device using an OpenID Discovery protocol. In an example implementation, the discovery logic 304 discovers the authentication systems that are authorized to respond to authentication requests from the client device 300 using the OpenID Discovery protocol. In accordance with this implementation, the discovery logic 304 may generate authentication system identifiers 320 to specify the authentication systems that are authorized to respond to authentication requests from the client device 300. In further accordance with this implementation, the storage logic 302 may generate the authorization list 312 based on the authentication system identifiers 320.

It will be recognized that the client device 300 may not include one or more of the storage logic 302, the discovery logic 304, the authentication logic 306, and/or the review logic 308. Furthermore, the client device 300 may include components in addition to or in lieu of the storage logic 302, the discovery logic 304, the authentication logic 306, and/or the review logic 308.

Figure 4:
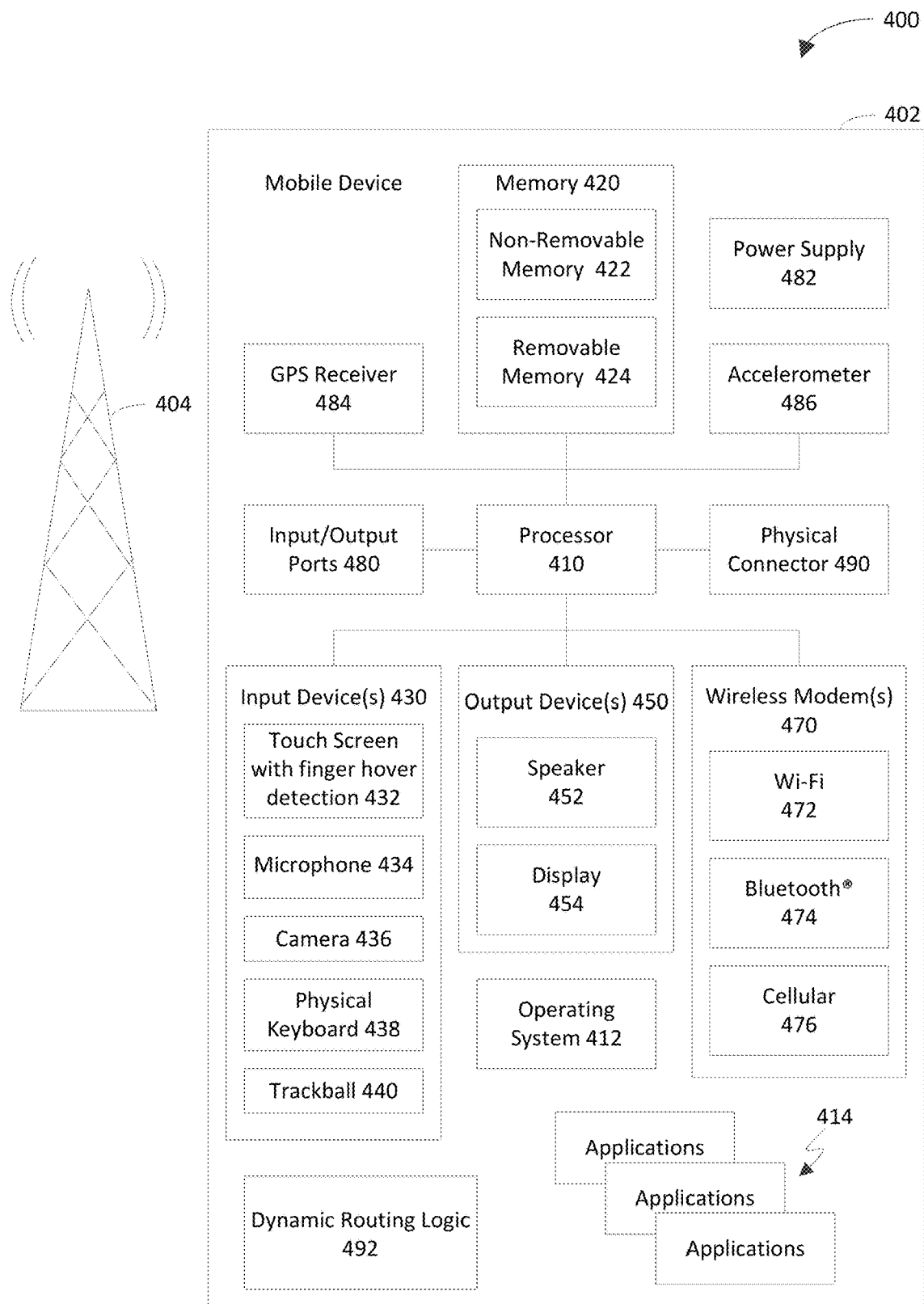
FIG. 4 is a system diagram of an exemplary mobile device in accordance with an embodiment.

FIG. 4 is a system diagram of an exemplary mobile device 400 including a variety of optional hardware and software components, shown generally as 402. Any components 402 in the mobile device may communicate with any other component, though not all connections are shown, for ease of illustration. The mobile device 400 may be any of a variety of computing devices (e.g., cell phone, smartphone, handheld computer, Personal Digital Assistant (PDA), etc.) and may allow wireless two-way communications with one or more mobile communications networks 404, such as a cellular or satellite network, or with a local area or wide area network.

The mobile device 400 may include a processor 410 (e.g., signal processor, microprocessor, ASIC, or other control and processing logic circuitry) for performing such tasks as signal coding, data processing, input/output processing, power control, and/or other functions. An operating system 412 may control the allocation and usage of the components 402 and support for one or more applications 414 (a.k.a. application programs). The applications 414 may include common mobile computing applications (e.g., email applications, calendars, contact managers, web browsers, messaging applications) and any other computing applications (e.g., word processing applications, mapping applications, media player applications).

The mobile device 400 may include memory 420. The memory 420 may include non-removable memory 422 and/or removable memory 424. The non-removable memory 422 may include RAM, ROM, flash memory, a hard disk, or other well-known memory storage technologies. The removable memory 424 may include flash memory or a Subscriber Identity Module (SIM) card, which is well known in GSM communication systems, or other well-known memory storage technologies, such as "smart cards." The memory 420 may store data and/or code for running the operating system 412 and the applications 414. Example data may include web pages, text, images, sound files, video data, or other data sets to be sent to and/or received from one or more network servers or other devices via one or more wired or wireless networks. Memory 420 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 400 may support one or more input devices 430, such as a touch screen 432, microphone 434, camera 436, physical keyboard 438 and/or trackball 440 and one or more output devices 450, such as a speaker 452 and a display 454. Touch screens, such as the touch screen 432, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 432 may support a finger hover detection using capacitive sensing, as is well understood in the art. Other detection techniques may be used, including but not limited to camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

The mobile device 400 may include dynamic routing logic 492. The dynamic routing logic 492 is configured to dynamically route an authentication request to a backup authentication system in accordance with any one or more of the techniques described herein.

Other possible output devices (not shown) may include piezoelectric or other haptic output devices. Some devices may serve more than one input/output function. For example, touch screen 432 and display 454 may be combined in a single input/output device. The input devices 430 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 412 or applications 414 may include speech-recognition software as part of a voice control interface that allows a user to operate the mobile device 400 via voice commands. Furthermore, the mobile device 400 may include input devices and software that allows for user interaction via a user's spatial gestures, such as detecting and interpreting gestures to provide input to a gaming application.

Wireless modem(s) 470 may be coupled to antenna(s) (not shown) and may support two-way communications between the processor 410 and external devices, as is well understood in the art. The modem(s) 470 are shown generically and may include a cellular modem 476 for communicating with the mobile communication network 404 and/or other radio-based modems (e.g., Bluetooth® 474 and/or Wi-Fi 472). At least one of the wireless modem(s) 470 is typically configured for communication with one or more cellular networks, such as a GSM network for data and voice communications within a single cellular network, between cellular networks, or between the mobile device and a public switched telephone network (PSTN).

The mobile device may further include at least one input/output port 480, a power supply 482, a satellite navigation system receiver 484, such as a Global Positioning System (GPS) receiver, an accelerometer 486, and/or a physical connector 490, which may be a USB port, IEEE 1394 (FireWire) port, and/or RS-232 port. The illustrated components 402 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the dynamic routing logic 114, the storage logic 302, the discovery logic 304, the authentication logic 306, the review logic 308, the dynamic routing logic 314, and/or flowchart 200 may be implemented in hardware, software, firmware, or any combination thereof.

For example, any one or more of the dynamic routing logic 114, the storage logic 302, the discovery logic 304, the authentication logic 306, the review logic 308, the dynamic routing logic 314, and/or flowchart 200 may be implemented, at least in part, as computer program code configured to be executed in one or more processors.

In another example, any one or more of the dynamic routing logic 114, the storage logic 302, the discovery logic 304, the authentication logic 306, the review logic 308, the dynamic routing logic 314, and/or flowchart 200 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 5:
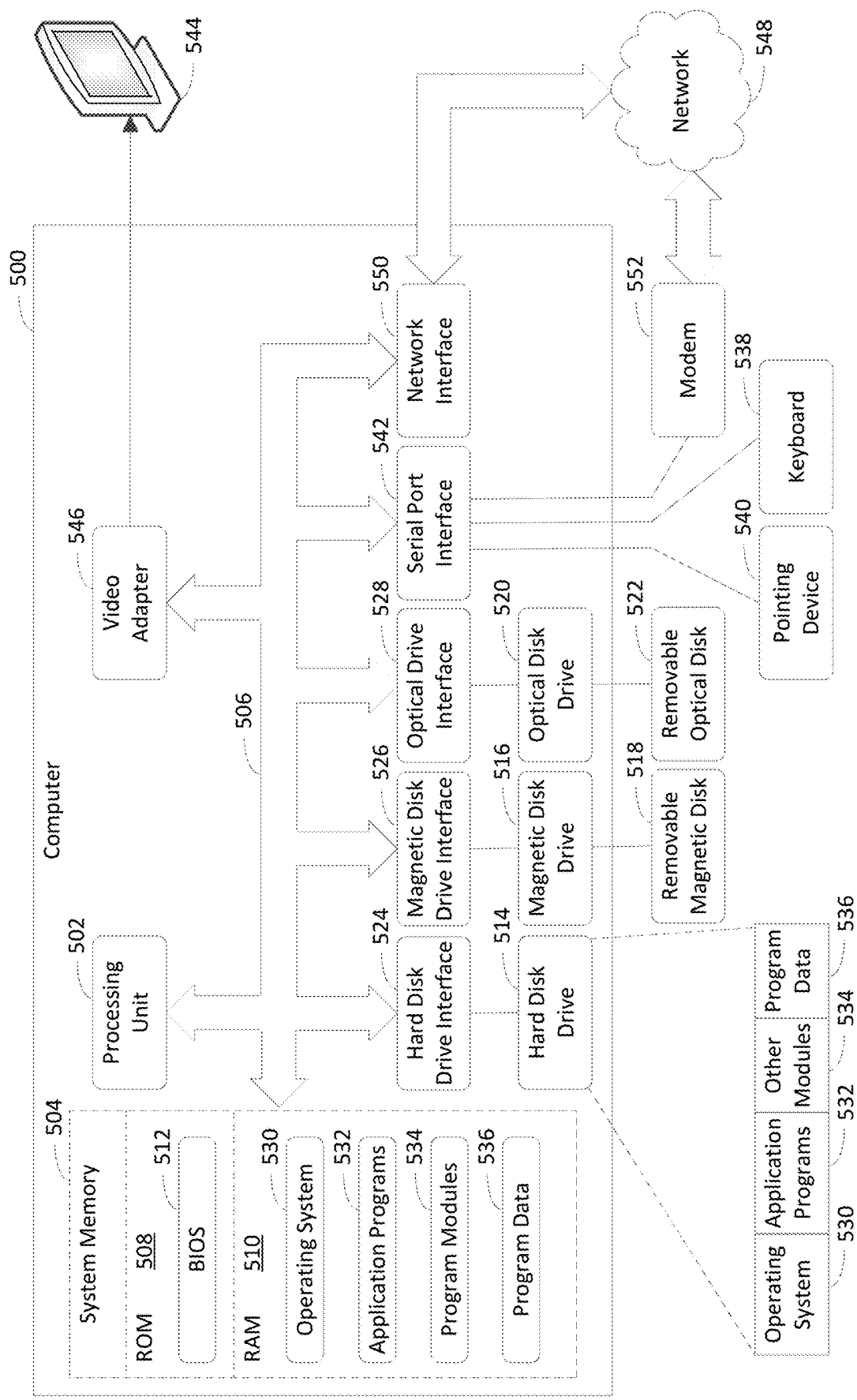
FIG. 5 depicts an example computer in which embodiments may be implemented.

III. Further Discussion of Some Example Embodiments (A1) An example client device (FIG. 1, 102; FIG. 3, 300; FIG. 4, 402; FIG. 5, 500) to dynamically route an authentication request (FIG. 3, 316) to a backup authentication system (FIG. 1, 108) comprises a memory (FIG. 4, 420, 422, 424; FIG. 5, 504, 508, 510) and one or more processors (FIG. 4, 410; FIG. 5, 502) coupled to the memory. The one or more processors are configured to store (FIG. 2, 202) a list (FIG. 3, 312), which identifies a plurality of authentication systems that are authorized to respond to authentication requests from the client device, in the memory. The one or more processors are further configured to send (FIG. 2, 204) the authentication request toward a primary authentication system (FIG. 1, 106) based at least in part on the authentication request identifying the primary authentication system as a recipient of the authentication request. The authentication request requests authentication of a principal by the primary authentication system. The one or more processors are further configured to cause (FIG. 2, 212) the backup authentication system, which is isolated from the primary authentication system, to authenticate the principal using an authentication package received from the primary authentication system, based at least in part on a first principal identifier in the authentication package that identifies the principal corresponding to a second principal identifier in the authentication request that identifies the principal and further based at least in part on a credential of the principal in the authentication request being verified using credential verification information in the authentication package that is usable to verify the credential, by dynamically routing the authentication request to the backup authentication system based at least in part on not receiving a valid response to the authentication request at the client device from the primary authentication system and further based at least in part on the list identifying the backup authentication system among the plurality of authentication systems that are authorized to respond to authentication requests from the client device.

(A2) In the example client device of A1, wherein the authentication package includes an authentication artifact and metadata associated with the authentication artifact; wherein the authentication artifact is signed with a cryptographic key belonging to the primary authentication system; wherein the authentication artifact includes one or more claims that are usable to authenticate the principal; and wherein the metadata includes the first principal identifier and the credential verification information.

(A3) In the example client device of any of A1-A2, wherein the one or more processors are configured to: send the authentication request toward the primary authentication system through a proxy system that is coupled between the client device and the backup authentication system; and dynamically route the authentication request from the client device to the backup authentication system without routing the authentication request through the proxy system.

(A4) In the example client device of any of A1-A3, wherein metadata in the authentication package indicates a range of internet protocol (IP) addresses in which an IP address of the principal is to be included as a criterion for authentication of the principal using the authentication package; and wherein the one or more processors are configured to cause the backup authentication system to authenticate the principal using the authentication package received from the primary authentication system further based at least in part on the IP address of the principal, as indicated by the authentication request, being included in the range of IP addresses.

(A5) In the example client device of any of A1-A4, wherein the one or more processors are configured to cause the backup authentication system to request an authentication artifact from the primary authentication system and to authenticate the principal using the authentication package, which is received from the primary authentication system prior to the request, as a result of the authentication artifact not being received from the primary authentication system in response to the request.

(A6) In the example client device of any of A1-A5, wherein the one or more processors are further configured to send a second authentication request, which requests authentication of the principal by the backup authentication system, to the backup authentication system such that the one or more processors cause the backup authentication system to request an authentication artifact from the primary authentication system and to authenticate the principal using the authentication artifact received from the primary authentication system, rather than using the authentication package, in response to the second authentication request.

(A7) In the example client device of any of A1-A6, wherein the one or more processors are configured to cause the backup authentication system to authenticate the principal in accordance with a federated identity protocol.

(A8) In the example client device of any of A1-A7, wherein the list includes a plurality of uniform resource identifiers of the plurality of respective authentication systems that are authorized to respond to authentication requests from the client device.

(A9) In the example client device of any of A1-A8, wherein the one or more processors are configured to execute a library that dynamically routes the authentication request to the backup authentication system based at least in part on a determination by the library that the list identifies the backup authentication system among the plurality of authentication systems that are authorized to respond to authentication requests from the client device.

(A10) In the example client device of any of A1-A9, wherein the one or more processors are further configured to discover the plurality of authentication systems that are authorized to respond to authentication requests from the client device using an OpenID Discovery protocol.

(B1) An example method of dynamically routing an authentication request (FIG. 3, 316) to a backup authentication system (FIG. 1, 108) by a client device (FIG. 1, 102; FIG. 3, 300; FIG. 4, 402; FIG. 5, 500) comprises storing (FIG. 2, 202) a list (FIG. 3, 312), which identifies a plurality of authentication systems that are authorized to respond to authentication requests from the client device, at the client device. The method further comprises sending (FIG. 2, 204) the authentication request from the client device toward a primary authentication system (FIG. 1, 106) based at least in part on the authentication request identifying the primary authentication system as a recipient of the authentication request. The authentication request requests authentication of a principal by the primary authentication system. The method further comprises causing (FIG. 2, 212), by the client device, the backup authentication system, which is isolated from the primary authentication system, to authenticate the principal using an authentication package received from the primary authentication system, based at least in part on a first principal identifier in the authentication package that identifies the principal corresponding to a second principal identifier in the authentication request that identifies the principal and further based at least in part on a credential of the principal in the authentication request being verified using credential verification information in the authentication package that is usable to verify the credential, by dynamically routing the authentication request to the backup authentication system based at least in part on not receiving a valid response to the authentication request at the client device from the primary authentication system and further based at least in part on the list identifying the backup authentication system among the plurality of authentication systems that are authorized to respond to authentication requests from the client device.

(B2) In the method of B1, wherein the authentication package includes an authentication artifact and metadata associated with the authentication artifact; wherein the authentication artifact is signed with a cryptographic key belonging to the primary authentication system; wherein the authentication artifact includes one or more claims that are usable to authenticate the principal; and wherein the metadata includes the first principal identifier and the credential verification information.

(B3) In the method of any of B1-B2, wherein sending the authentication request from the client device toward the primary authentication system comprises sending the authentication request from the client device toward the primary authentication system through a proxy system that is coupled between the client device and the backup authentication system; and wherein causing the backup authentication system to authenticate the principal comprises dynamically routing the authentication request from the client device to the backup authentication system without routing the authentication request through the proxy system.

(B4) In the method of any of B1-B3, wherein metadata in the authentication package indicates a range of internet protocol (IP) addresses in which an IP address of the principal is to be included as a criterion for authentication of the principal using the authentication package; and wherein causing the backup authentication system to authenticate the principal comprises causing, by the client device, the backup authentication system to authenticate the principal using the authentication package received from the primary authentication system further based at least in part on the IP address of the principal, as indicated by the authentication request, being included in the range of IP addresses.

(B5) In the method of any of B1-B4, wherein causing the backup authentication system to authenticate the principal comprises causing, by the client device, the backup authentication system to request an authentication artifact from the primary authentication system and to authenticate the principal using the authentication package, which is received from the primary authentication system prior to the request, as a result of the authentication artifact not being received from the primary authentication system in response to the request.

(B6) In the method of any of B1-B5, further comprising sending a second authentication request, which requests authentication of the principal by the backup authentication system, to the backup authentication system, wherein sending the second authentication request causes the backup authentication system to request an authentication artifact from the primary authentication system and to authenticate the principal using the authentication artifact received from the primary authentication system, rather than using the authentication package, in response to the second authentication request.

(B7) In the method of any of B1-B6, wherein causing the backup authentication system to authenticate the principal comprises causing, by the client device, the backup authentication system to authenticate the principal in accordance with a federated identity protocol.

(B8) In the method of any of B1-B7, wherein the list includes a plurality of uniform resource identifiers of the plurality of respective authentication systems that are authorized to respond to authentication requests from the client device.

(B9) In the method of any of B1-B8, wherein causing the backup authentication system to authenticate the principal comprises executing, by the client device, a library that dynamically routes the authentication request to the backup authentication system based at least in part on a determination by the library that the list identifies the backup authentication system among the plurality of authentication systems that are authorized to respond to authentication requests from the client device.

(B10) In the method of any of B1-B9, further comprising discovering the plurality of authentication systems that are authorized to respond to authentication requests from the client device using an OpenID Discovery protocol.

(C1) An example computer program product (FIG. 4, 424; FIG. 5, 518, 522) comprising a computer-readable storage medium having instructions recorded thereon for enabling a processor-based client device (FIG. 1, 102; FIG. 3, 300; FIG. 4, 402; FIG. 5, 500) to dynamically route an authentication request (FIG. 3, 316) to a backup authentication system (FIG. 1, 108) by performing operations, the operations comprising: storing (FIG. 2, 202) a list (FIG. 3, 312), which identifies a plurality of authentication systems that are authorized to respond to authentication requests from the client device, at the client device; sending (FIG. 2, 204) the authentication request from the client device toward a primary authentication system (FIG. 1, 106) based at least in part on the authentication request identifying the primary authentication system as a recipient of the authentication request, the authentication request requesting authentication of a principal by the primary authentication system; and causing (FIG. 2, 212) the backup authentication system, which is isolated from the primary authentication system, to authenticate the principal using an authentication package received from the primary authentication system, based at least in part on a first principal identifier in the authentication package that identifies the principal corresponding to a second principal identifier in the authentication request that identifies the principal and further based at least in part on a credential of the principal in the authentication request being verified using credential verification information in the authentication package that is usable to verify the credential, by dynamically routing the authentication request to the backup authentication system based at least in part on not receiving a valid response to the authentication request at the client device from the primary authentication system and further based at least in part on the list identifying the backup authentication system among the plurality of authentication systems that are authorized to respond to authentication requests from the client device.

IV. Example Computer System

FIG. 5 depicts an example computer 500 in which embodiments may be implemented. Any one or more of the client device 102, the proxy system 104, the primary authentication system 106, the backup authentication system 108, and/or the resource provider 110 show in FIG. 1 and/or the client device 300 shown in FIG. 3 may be implemented using computer 500, including one or more features of computer 500 and/or alternative features. Computer 500 may be a general-purpose computing device in the form of a conventional personal computer, a mobile computer, or a workstation, for example, or computer 500 may be a special purpose computing device. The description of computer 500 provided herein is provided for purposes of illustration, and is not intended to be limiting. Embodiments may be implemented in further types of computer systems, as would be known to persons skilled in the relevant art(s).

As shown in FIG. 5, computer 500 includes a processing unit 502, a system memory 504, and a bus 506 that couples various system components including system memory 504 to processing unit 502. Bus 506 represents one or more of any of several types of bus structures, including a memory bus or memory controller, a peripheral bus, an accelerated graphics port, and a processor or local bus using any of a variety of bus architectures. System memory 504 includes read only memory (ROM) 508 and random access memory (RAM) 510. A basic input/output system 512 (BIOS) is stored in ROM 508.

Computer 500 also has one or more of the following drives: a hard disk drive 514 for reading from and writing to a hard disk, a magnetic disk drive 516 for reading from or writing to a removable magnetic disk 518, and an optical disk drive 520 for reading from or writing to a removable optical disk 522 such as a CD ROM, DVD ROM, or other optical media. Hard disk drive 514, magnetic disk drive 516, and optical disk drive 520 are connected to bus 506 by a hard disk drive interface 524, a magnetic disk drive interface 526, and an optical drive interface 528, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 530, one or more application programs 532, other program modules 534, and program data 536. Application programs 532 or program modules 534 may include, for example, computer program logic for implementing any one or more of (e.g., at least a portion of) the dynamic routing logic 114, the storage logic 302, the discovery logic 304, the authentication logic 306, the review logic 308, the dynamic routing logic 314, and/or flowchart 200 (including any step of flowchart 200), as described herein.

A user may enter commands and information into the computer 500 through input devices such as keyboard 538 and pointing device 540. Other input devices (not shown) may include a microphone, joystick, game pad, satellite dish, scanner, touch screen, camera, accelerometer, gyroscope, or the like. These and other input devices are often connected to the processing unit 502 through a serial port interface 542 that is coupled to bus 506, but may be connected by other interfaces, such as a parallel port, game port, or a universal serial bus (USB).

A display device 544 (e.g., a monitor) is also connected to bus 506 via an interface, such as a video adapter 546. In addition to display device 544, computer 500 may include other peripheral output devices (not shown) such as speakers and printers.

Computer 500 is connected to a network 548 (e.g., the Internet) through a network interface or adapter 550, a modem 552, or other means for establishing communications over the network. Modem 552, which may be internal or external, is connected to bus 506 via serial port interface 542.

As used herein, the terms "computer program medium" and "computer-readable storage medium" are used to generally refer to media (e.g., non-transitory media) such as the hard disk associated with hard disk drive 514, removable magnetic disk 518, removable optical disk 522, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 532 and other program modules 534) may be stored on the hard disk, magnetic disk, optical disk, ROM, or RAM. Such computer programs may also be received via network interface 550 or serial port interface 542. Such computer programs, when executed or loaded by an application, enable computer 500 to implement features of embodiments discussed herein. Accordingly, such computer programs represent controllers of the computer 500.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A client device to dynamically route an authentication request to a backup authentication system, the client device comprising:

a memory; and one or more processors coupled to the memory, the one or more processors configured to:

store a list, which identifies a plurality of authentication systems that are authorized to respond to authentication requests from the client device, in the memory;

based at least on the authentication request identifying a primary authentication system as a recipient of the authentication request, send the authentication request toward the primary authentication system, the authentication request indicating that a principal is to be authenticated by the primary authentication system, the authentication request comprising a first principal identifier that identifies the principal and a credential of the principal; and cause the backup authentication system, which is isolated from the primary authentication system, to perform an authentication of the principal using an authentication package received from the primary authentication system by dynamically routing the authentication request to the backup authentication system, the authentication package comprising a second principal identifier that identifies the principal and credential verification information that is capable of being used to verify the credential, the authentication based at least on:

the authentication package being received at the backup authentication system from the primary authentication system prior to the authentication request being dynamically routed from the client device to the backup authentication system, the second principal identifier in the authentication package corresponding to the first principal identifier in the authentication request, the credential of the principal in the authentication request being verified using the credential verification information in the authentication package, passage of at least a designated amount of time since the authentication request was sent toward the primary authentication system by the client device, and the list identifying the backup authentication system among the plurality of authentication systems that are authorized to respond to authentication requests from the client device.

2. The client device of claim 1, wherein the authentication package comprises an authentication artifact and metadata associated with the authentication artifact;
- wherein the authentication artifact is signed with a cryptographic key belonging to the primary authentication system;
- wherein the authentication artifact comprises one or more claims that are capable of being used to authenticate the principal; and
- wherein the metadata comprises the second principal identifier and the credential verification information.

3. The client device of claim 1, wherein the one or more processors are configured to:
- send the authentication request toward the primary authentication system through a proxy system that is coupled between the client device and the backup authentication system; and
- dynamically route the authentication request from the client device to the backup authentication system without routing the authentication request through the proxy system again.

4. The client device of claim 1, wherein metadata in the authentication package indicates a range of internet protocol (IP) addresses in which an IP address of the principal is to be included as a criterion for authentication of the principal using the authentication package; and
- wherein the one or more processors are configured to:
  - cause the backup authentication system to authenticate the principal using the authentication package received from the primary authentication system further based at least in part on the IP address of the principal, as indicated by the authentication request, being included in the range of IP addresses.

5. The client device of claim 1, wherein the one or more processors are configured to:
- cause the backup authentication system to request an authentication artifact from the primary authentication system after the authentication package is received from the primary authentication system; and
- cause the backup authentication system to authenticate the principal using the authentication package as a result of the authentication artifact not being received from the primary authentication system in response to the request.

6. The client device of claim 1, wherein the one or more processors are configured to:
- cause the backup authentication system to authenticate the principal in accordance with a federated identity protocol.

7. The client device of claim 1, wherein the list comprises a plurality of uniform resource identifiers of the plurality of respective authentication systems that are authorized to respond to authentication requests from the client device.

8. The client device of claim 1, wherein the one or more processors are configured to:
- execute a library that dynamically routes the authentication request to the backup authentication system based at least in part on a determination by the library that the list identifies the backup authentication system among the plurality of authentication systems that are authorized to respond to authentication requests from the client device.

9. The client device of claim 1, wherein the one or more processors are further configured to:
- discover the plurality of authentication systems that are authorized to respond to authentication requests from the client device using an OpenID Discovery protocol.

10. A method of dynamically routing an authentication request to a backup authentication system by a client device, the method comprising:
- storing a list, which identifies a plurality of authentication systems that are authorized to respond to authentication requests from the client device, at the client device;
- based at least on the authentication request identifying a primary authentication system as a recipient of the authentication request, sending the authentication request from the client device toward the primary authentication system, the authentication request indicating that a principal is to be authenticated by the primary authentication system, the authentication request comprising a first principal identifier that identifies the principal and a credential of the principal; and
- causing, by the client device, the backup authentication system, which is isolated from the primary authentication system, to perform an authentication of the principal using an authentication package received from the primary authentication system by dynamically routing the authentication request to the backup authentication system, the authentication package comprising a second principal identifier that identifies the principal and credential verification information that is capable of being used to verify the credential, the authentication based at least on:
  - the authentication package being received at the backup authentication system from the primary authentication system prior to the authentication request being dynamically routed from the client device to the backup authentication system,
  - the second principal identifier in the authentication package corresponding to the first principal identifier in the authentication request,
  - the credential of the principal in the authentication request being verified using the credential verification information in the authentication package,
  - passage of at least a designated amount of time since the authentication request was sent toward the primary authentication system by the client device, and
  - the list identifying the backup authentication system among the plurality of authentication systems that are authorized to respond to authentication requests from the client device.

11. The method of claim 10, wherein the authentication package comprises an authentication artifact and metadata associated with the authentication artifact;
- wherein the authentication artifact is signed with a cryptographic key belonging to the primary authentication system;
- wherein the authentication artifact comprises one or more claims that are capable of being used to authenticate the principal; and
- wherein the metadata comprises the second principal identifier and the credential verification information.

12. The method of claim 10, wherein sending the authentication request from the client device toward the primary authentication system comprises:
- sending the authentication request from the client device toward the primary authentication system through a proxy system that is coupled between the client device and the backup authentication system; and
- wherein causing the backup authentication system to authenticate the principal comprises:

dynamically routing the authentication request from the client device to the backup authentication system without routing the authentication request through the proxy system again.

13. The method of claim 10, wherein metadata in the authentication package indicates a range of internet protocol (IP) addresses in which an IP address of the principal is to be included as a criterion for authentication of the principal using the authentication package; and wherein causing the backup authentication system to authenticate the principal comprises:

causing, by the client device, the backup authentication system to authenticate the principal using the authentication package received from the primary authentication system further based at least in part on the IP address of the principal, as indicated by the authentication request, being included in the range of IP addresses.

14. The method of claim 10, wherein causing the backup authentication system to authenticate the principal comprises:

causing, by the client device, the backup authentication system to request an authentication artifact from the primary authentication system after the authentication package is received from the primary authentication system; and causing, by the client device, the backup authentication system to authenticate the principal using the authentication package as a result of the authentication artifact not being received from the primary authentication system in response to the request.

15. The method of claim 10, further comprising:

sending a second authentication request, which requests authentication of the principal by the backup authentication system, to the backup authentication system, wherein sending the second authentication request causes the backup authentication system to request an authentication artifact from the primary authentication system and to authenticate the principal using the authentication artifact received from the primary authentication system, rather than using the authentication package, in response to the second authentication request.

16. The method of claim 10, wherein causing the backup authentication system to authenticate the principal comprises:

causing, by the client device, the backup authentication system to authenticate the principal in accordance with a federated identity protocol.

17. The method of claim 10, wherein the list comprises a plurality of uniform resource identifiers of the plurality of respective authentication systems that are authorized to respond to authentication requests from the client device.

18. The method of claim 10, wherein causing the backup authentication system to authenticate the principal comprises:

executing, by the client device, a library that dynamically routes the authentication request to the backup authentication system based at least in part on a determination by the library that the list identifies the backup authentication system among the plurality of authentication systems that are authorized to respond to authentication requests from the client device.

19. The method of claim 10, further comprising:

discovering the plurality of authentication systems that are authorized to respond to authentication requests from the client device using an OpenID Discovery protocol.

20. A computer program product comprising a computer-readable storage medium having instructions recorded thereon for enabling a processor-based client device to dynamically route an authentication request to a backup authentication system by performing operations, the operations comprising:

storing a list, which identifies a plurality of authentication systems that are authorized to respond to authentication requests from the client device, at the client device;

based at least on the authentication request identifying a primary authentication system as a recipient of the authentication request, sending the authentication request from the client device toward the primary authentication system, the authentication request indicating that a principal is to be authenticated by the primary authentication system, the authentication request comprising a first principal identifier that identifies the principal and a credential of the principal; and causing the backup authentication system, which is isolated from the primary authentication system, to perform an authentication of the principal using an authentication package received from the primary authentication system by dynamically routing the authentication request to the backup authentication system, the authentication package comprising a second principal identifier that identifies the principal and credential verification information that is capable of being used to verify the credential, the authentication based at least on:

the authentication package being received at the backup authentication system from the primary authentication system prior to the authentication request being dynamically routed from the client device to the backup authentication system, the second principal identifier in the authentication package corresponding to the first principal identifier in the authentication request, the credential of the principal in the authentication request being verified using the credential verification information in the authentication package, passage of at least a designated amount of time since the authentication request was sent toward the primary authentication system by the client device, and the list identifying the backup authentication system among the plurality of authentication systems that are authorized to respond to authentication requests from the client device.

* * * * *